W. S. BOON.
SIFTING-SCOOP.
No. 170,152. Patented Nov. 23, 1875.
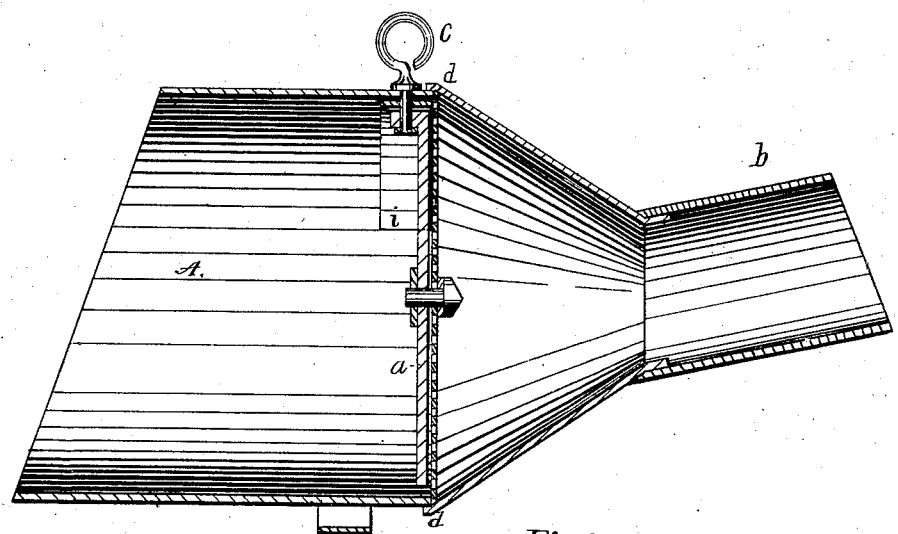
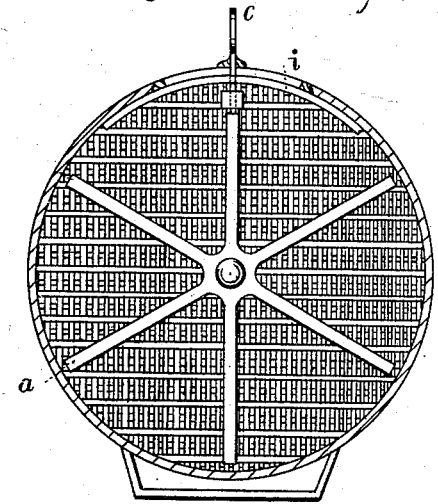
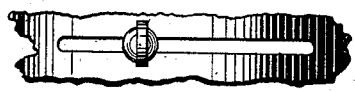
Witnesses — Chas. C. Gill, R. Goodridge
Inventor — Willard S. Boon by his attys. Cox & Cox

UNITED STATES PATENT OFFICE.

WILLARD S. BOON, OF ALPENA, MICHIGAN.

IMPROVEMENT IN SIFTING-SCOOPS.

Specification forming part of Letters Patent No. 170,152, dated November 23, 1875; application filed October 4, 1875.

*To all whom it may concern:*

Be it known that I, WILLARD S. BOON, of Alpena, in the county of Alpena and State of Michigan, have invented a new and useful Improvement in a Scoop Flour-Sifter, for the purpose of sifting flour, meal, &c.; and I do hereby declare that the following is a full and exact description of the same.

The invention relates to a scoop to be used for the purposes of taking up and sifting flour, meal, and analogous material; and consists in the device hereinafter more fully described.

Figure 1 is a vertical central longitudinal section of a device embodying the elements of the invention. Fig. 2 is a vertical transverse view of the same on the line $x\,x$. Fig. 3 is a detached view of the slot-cover and handle C.

A in the accompanying drawings represents a cylinder, having its front cut transversely from top to bottom, and forming the principal portion of the scoop, the rear of which is reduced to the truncated cone $d$, terminating in the hollow handle $b$. At the rear or base of the cylinder A are secured the edges of the sieve B, having at its center a solid center, D, to receive as a bearing one end of the axle E, which is secured in place by the button $f$ at one end, and by being rigidly attached to the agitator $a$ at the other. The agitator is composed of any desired number of arms radiating from a common center, one of the arms being furnished at its outer extremity with the stud $h$, to receive one end of the pin I, which projects through the movable cover $i$, which protects the slot $l$, the cover being secured in place against the inside of the cylinder A by the button $m$, which binds against the outside of the cylinder, forming the head of the pin I, and terminating in the handle C. The device is also provided with the rest $e$, which consists of a piece of material having its end parts bent at right angles, and its extremities secured to the outside of the lower portion of the cylinder. That portion of the rest between the angles being straight, and the rest being placed forward the center of gravity of the scoop, it is obvious that the same can be placed upon any flat surface without spilling its contents.

The scoop can be filled by plunging the cylinder into the material in the usual manner; and when thus filled, to sift the flour into the desired place, it is only necessary to hold the handle $b$ above it, and oscillate the handle C of the agitator $a$. This stirs the flour over the sieve, whence it descends through the cone $d$ and handle $b$ to the desired place.

What I claim as my invention, and desire to secure by Letters Patent, is—

1. In combination with a sifting-scoop, the tubular handle $b$, for the purpose specified.

2. A combined flour scoop and sifter, provided with a rest, $e$, substantially as set forth.

3. The agitator $a$, pivoted at its center, in combination with a scoop having the hollow handle $b$, substantially as stated.

4. In a sifting-scoop, the combination of the agitator $a$, handle C, slot-cover $i$, and hollow handle $b$, substantially as specified.

WILLARD S. BOON.

Witnesses:
PAUL DANE,
MARY ANN BELL.